(12) United States Patent
Chan et al.

(10) Patent No.: US 6,644,864 B2
(45) Date of Patent: Nov. 11, 2003

(54) STACKED OPTICAL COUPLER

(75) Inventors: Benson Chan, Vestal, NY (US);
Richard R. Hall, Endwell, NY (US);
How T. Lin, Lisle, NY (US); John H. Sherman, Lisle, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/097,767

(22) Filed: Mar. 14, 2002

(65) Prior Publication Data

US 2003/0174970 A1 Sep. 18, 2003

(51) Int. Cl.⁷ .................................................. G02B 6/38
(52) U.S. Cl. .......................................... 385/65; 385/59
(58) Field of Search ............................... 385/53, 54, 55, 385/59, 60, 65, 77, 78, 83, 52, 114, 51, 71

(56) References Cited

U.S. PATENT DOCUMENTS

| | | |
|---|---|---|
| 4,184,070 A | 1/1980 | McBride, Jr. |
| 4,762,387 A | 8/1988 | Batdorf et al. |
| 5,044,711 A | 9/1991 | Saito |
| 5,266,352 A | 11/1993 | Filas et al. |
| 5,379,361 A | 1/1995 | Maekawa et al. |
| 5,434,939 A | 7/1995 | Matsuda |
| 5,689,599 A * | 11/1997 | Shahid ........................ 385/83 |
| 5,854,867 A | 12/1998 | Lee et al. |
| 5,901,262 A | 5/1999 | Kobayashi et al. |
| 6,234,687 B1 | 5/2001 | Hall et al. |
| 6,386,767 B1 * | 5/2002 | Naghski ...................... 385/59 |

FOREIGN PATENT DOCUMENTS

| | | |
|---|---|---|
| EP | 1039323 A1 | 9/2000 |
| EP | 1039324 A1 | 9/2000 |
| JP | 05224093 | 9/1993 |
| JP | 08220282 | 8/1996 |
| JP | 08286081 | 11/1996 |
| JP | 09127375 | 5/1997 |

OTHER PUBLICATIONS

Delphion Intellectual Property Network; *High–Density Optical Fiber Arrays for Optoelectronic Devices*; pp. 463–464 (1989).
Fabrication of a 2D connector for coupling a 4×8 array of small diameter plastic optical fiber (117/125μm) to RCLED or VCSEL arrays (No Date).
The American Heritage Dictionary of the English Language, Fourth Edition, Copyright 2000 by Houghton Mifflin Co. meaning 2a, accessed online at Dictionary.com.

* cited by examiner

*Primary Examiner*—Lynn Feild
*Assistant Examiner*—Son V. Nguyen
(74) *Attorney, Agent, or Firm*—Connolly Bove Lodge & Hutz LLP; Arthur J. Samodovitz

(57) ABSTRACT

The present invention relates generally to fiber optical arrays, and particularly, but not by way of limitation, to 3-dimentional array fiber optical couplers. More particularly, the present invention provides means of coupling semiconductor laser light sources to fiber-optic transmission devices.

19 Claims, 2 Drawing Sheets

STACKED OPTICAL COUPLER

FIELD OF THE INVENTION

The present invention relates generally to fiber optical arrays, and particularly, but not by way of limitation, to 3-dimentional array fiber optical couplers.

BACKGROUND OF THE INVENTION

There is an increased requirement in industry for parallel optical transmission systems employing semiconductor lasers. This requirement in turn requires the provision of devices to couple laser light sources with fiber-optic transmission devices. The coupler of the present invention, will interface with arrayed designs that include Vertical Cavity Surface Emitting Lasers (VCSELs), laser diodes, detectors, etc. One major requirement of the coupler is that all individual fibers must be very precisely located so that proper alignment maximizes light transmission through the fibers.

Other objects and advantages will become apparent from the following disclosure.

SUMMARY OF THE INVENTION

The invention achieves solutions to the problems discussed above by providing a stacked coupler for an optical fiber array comprising:

Top(16) and bottom (10) plates, each substantially a rectangular prism having first and second substantially parallel major surfaces, wherein each said first surface has first (12) and second (14) substantially parallel grooves formed therein, and wherein said plates are disposed such that the respective grooves oppose; first and second side plates walls (20), each of said plates walls formed substantially as a rectangular prism having first and second major surfaces, a length, and bottom and top edges parallel to said length, wherein said bottom edge of said first wall is disposed within said first groove of said base-plate, said top edge of said first wall is disposed within said first groove of said top-plate, said bottom edge of said second wall is disposed within said second groove of said base-plate, said top edge of said second wall is disposed within said second groove of said top-plate, wherein each said first surface has a plurality of ferrule grooves (22) formed therein, and wherein each said second surface has at least one pin groove (24) formed therein, said pins are disposed such that said ferrule grooves oppose; a plurality of ferrules (30), formed substantially as a rectangular prism having first and second ends and first and second substantially parallel ferrule surfaces, wherein each said ferrule surface has a plurality of substantially parallel fiber grooves (32) formed therein, wherein said fiber grooves are spaced at a substantially constant pitch (34); and wherein said ends are disposed within said ferrule grooves; and a plurality of retaining plates (40), formed substantially as a rectangular prism having top and bottom substantially parallel major surfaces, wherein said retaining plates are disposed parallel to and interlaced with said ferrules and said top and bottom plates.

An aspect of the invention provides two means of maintaining the optical fibers in precise registration. In a first means, silicon pieces are fabricated to close tolerances to provide for fiber registration. In a second means, a retaining plate, preferably of an elastomeric material, forces the fibers against the substantially non-deformable silicon pieces.

An aspect of the invention provides a silicon ferrule having a precise array of parallel V-grooves formed therein for containing optical fibers. Furthermore, an elastomeric retaining plate forces the fibers to remain in said grooves.

An aspect of the invention provides precise alignment of the fibres without requiring . . .

An aspect of the invention provides an optical coupler having a relatively small horizontal footprint. According to this aspect, the fiber array is divided into a plurality of vertically-stacked subarrays.

According to another aspect of the invention, accumulation of tolerance error brought about by stacking multiple silicon pieces is reduced or eliminated by providing spacer bars.

According to another aspect of the invention, the array of parallel V-grooves is formed to have a substantially constant pitch. The pitch being defined as the center-to-center spacing of the grooves.

According to a further aspect of the invention, the centers of the V-grooves of a first subarray are in register with the centers of the V-grooves of its neighboring subarrays.

According to a further aspect of the invention, the registration of the V-grooves of a first array is offset with respect to its neighboring subarray by a constant fraction of a period. By way of non-limiting example, the registration of neighboring subarrays may be shifted by one half period.

Still other objects and advantages of the present invention will become readily apparent by those skilled in the art from the following detailed description, wherein it is shown and described preferred embodiments of the invention, simply by way of illustration of the best mode contemplated of carrying out the invention. As will be realized the invention is capable of other and different embodiments, and its several details are capable of modifications in various obvious respects, without departing from the invention. Accordingly, the description is to be regarded as illustrative in nature and not as restrictive.

BRIEF DESCRIPTION OF DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

It is to be noted, however, that the appended drawings illustrate only typical embodiments of this invention and are therefore not to be considered limiting of its scope, for the invention may admit to other equally effective embodiments.

DETAILED DESCRIPTION OF PREFERRED EMBODIMENT

Reference is made to the figures to illustrate selected embodiments and preferred modes of carrying out the invention. It is to be understood that the invention is not hereby limited to those aspects depicted in the figures.

Figure 1:
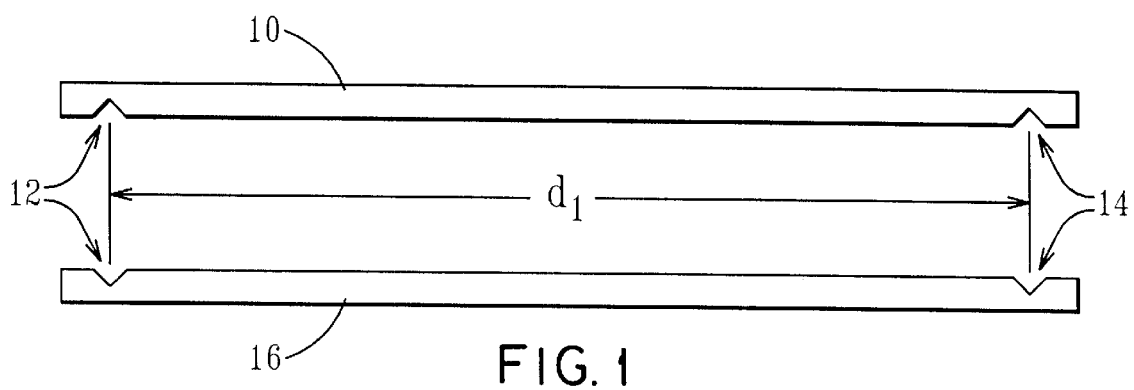
FIG. 1: side view of top and bottom plates.
Figure 5:
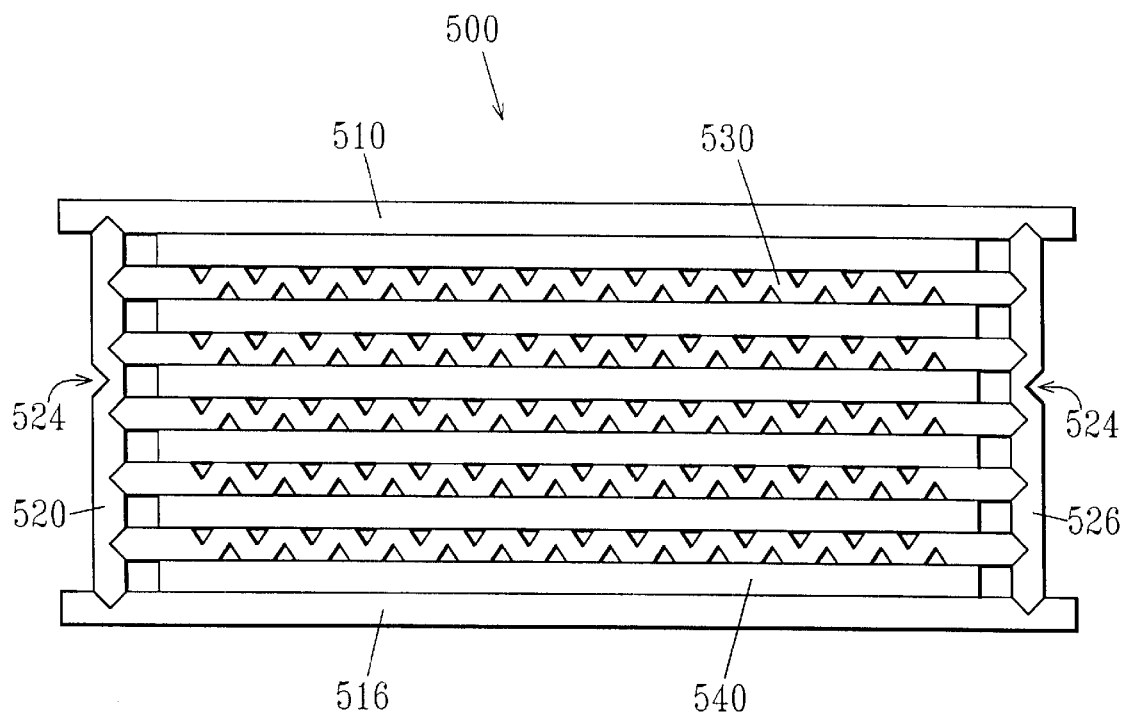
FIG. 5 end view of assembled coupler.

Turning now to FIG. 5, an end plan view of the inventive optical coupler (500) is depicted. Coupler (500) comprises top (516) and bottom (510) plates, substantially identical in construction, but opposed in orientation. As depicted in FIG. 1, the plates each comprise a rectangular prism one major surface of which is provided substantially parallel first (12) and second (14) grooves spaced by a distance ($d_1$). In a preferred embodiment, the spacing, $d_1$, is about 7.5 millimeter (nmu), the current industry standard spacing. However, any convenient spacing may be adopted. The preferred thickness of plates (10) and (16) is about 1 mm. In a top plan view, plates (10) and (16) are rectangular with width about 10 mm and length about 10 mm. Grooves (12) and (14) are 1 mm at their widest point and are etched at the typical 54.74 degrees angle.

Figure 2:
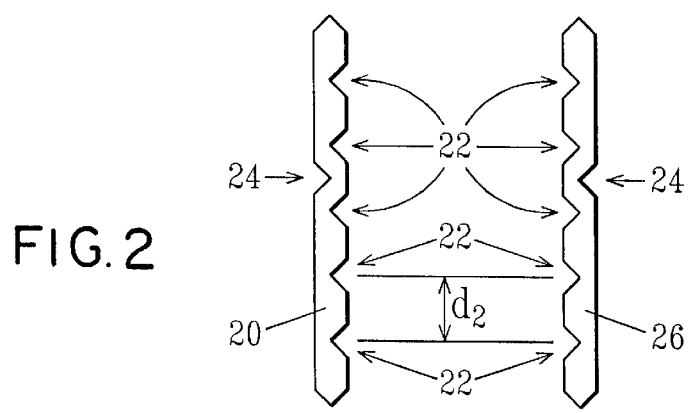
FIG. 2: end view of side wall.
Figure 3:
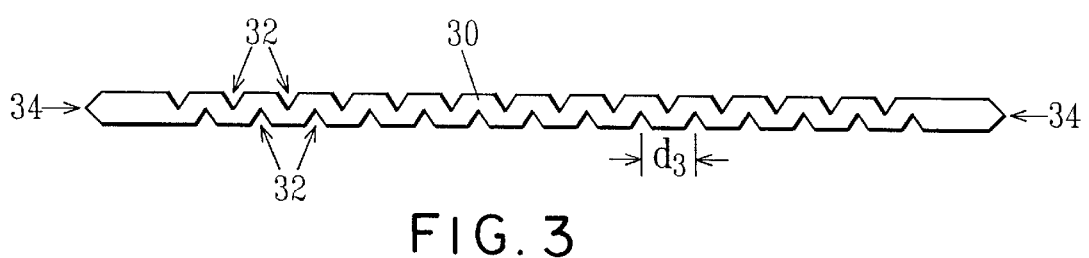
FIG. 3 side view of ferrule.
Figure 4:
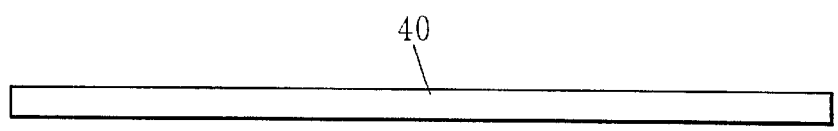
FIG. 4 side view of retaining plate.

Fixed within grooves (12) is a first side wall (520) and within grooves (14) is a second side wall (526). The side walls are affixed within the grooves by adhesive means. The adhesive means may comprise epoxy, and preferably comprise a UV curable epoxy. As depicted in FIG. 2, each side wall (520, 526) has a first surface provided an array of ferrule grooves (22). When forming a portion of coupler (500) the groove arrays are opposed. In a preferred embodiment, the ferrule grooves (22) are spaced with a regular periodicity of distance $d_2$. A preferred embodiment provides a 1.75 mm row-to-row spacing. Each side wall (520, 526) has a second surface provided at least one pin groove (24). In a preferred embodiment, pin grooves (24) are dimensioned to receive industry standard "MT style" connector pins. Fitted within the array of ferrule grooves (22) is a plurality of ferrules (530). The ferrules are affixed within the grooves by adhesive means. The adhesive means may comprise UV curable structural epoxies e.g. Dymax 6-628 or Ablestick 88060. As indicated in FIG. 3, each ferrule (30) has first and second major surfaces wherein each major surface is provided an array of fiber grooves (32). In a preferred embodiment, the array comprises 12 grooves. In a preferred embodiment, the fiber grooves (32) are spaced with a regular periodicity ($d_3$) of about 250 micrometers. In a preferred embodiment, the array of the second major surface is offset laterally with respect to the array on the first major surface by one half of the period $d_3$. Other offset, including no offset, is consistent with the invention. Each ferrule (30) has ends (34) complementary to ferrule grooves (22). Fiber grooves (32) are preferably V-shaped and about 250 microns wide at their widest point by 50 microns deep.

A plurality of retaining plates (540) is interleaved with ferrules (530). The retaining plates are substantially rectangular prisms, preferably 0.5 mm thick, 10 mm long, and 10 mm wide. The retaining plates may be maintained in position by friction and compression or by adhesive means.

In a preferred embodiment, the retaining plates comprise elastomer. In a more preferred embodiment, the elastomer is e.g. silicone rubber.

The dimensions of the inventive coupler and of its component parts have been adapted to conform to industry standard optical fibers. Other dimensions may be employed, consistent with the invention, to adapt to non-standard optical fibers or where the industry adopts a different standard for optical fibers. Typical fibers are clad, and have diameters of about 125 microns. They are retained within the grooves through mechanical clamping between the silicon coupler and the elastomer retaining plates.

In a preferred embodiment, the top and bottom plates, side wall, and ferrules comprise silicon. In a more preferred embodiment the silicon consists of single crystal silicon. In a most preferred embodiment, the single crystal silicon is oriented with the {100} plane vertical.

In a preferred embodiment grooves (12, 14, 22, 24, and 32) are V-grooves. In a preferred embodiment, the V-grooves are formed by anisotropic wet-etch methods. As is known in the art, anisotropic wet etchants include, but are not limited to, alkali metal hydroxides, simple and quaternary ammonium hydroxides, and aqueous ethylenediamine-pyrochatechol (EDP) solutions.

The foregoing description of the invention illustrates and describes the present invention. Additionally, the disclosure shows and describes only the preferred embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. A stacked coupler for an optical fiber array comprising:
   top (16) and bottom (10) plates,
      each substantially a rectangular prism having first and second substantially parallel major surfaces, wherein each of said first surfaces has first (12) and second (14) substantially parallel grooves formed therein, and wherein said plates are disposed such that the respective grooves oppose;
   first and second side walls (20),
      each of said walls formed substantially as a rectangular prism having first and second substantially parallel edges and first and second major surfaces extending between said edges, wherein said bottom edge of said first wall is disposed within said first groove of said bottom plate, said top edge of said first wall is disposed within said first groove of said top-plate, said bottom edge of said second wall is disposed within said second groove of said bottom plate, said top edge of said second wall is disposed within second groove of said top-plate, wherein each said first side-wall major surface has a plurality of ferrule grooves (22) formed therein, and wherein each said second side-wall major surface has at least one pin groove (24) formed therein, said walls are disposed such that said ferrule grooves oppose;
   a plurality of ferrules (30),
      each formed substantially as a rectangular prism having first and second ends and first and second substantially parallel ferrule surfaces, wherein each of said ferrule surface has a plurality of substantially parallel fiber grooves (32) formed therein,
      wherein said fiber grooves are spaced at a substantially constant pitch; and
      wherein said ends are disposed within said ferrule grooves; and
   a plurality of retaining plates (40),
      each formed substantially as a rectangular prism having top and bottom substantially parallel major surfaces, wherein said retaining plates are disposed parallel to and interlaced with said ferrules and said top and bottom plates.

2. A stacked coupler for an optical fiber array, according to claim 1, wherein the pitch of said fiber grooves on said first ferrule surface is substantially the same as the pitch of said fiber grooves on said second ferrule surface.

3. A stacked coupler for an optical fiber array, according to claim 1, wherein the pitch of said fiber grooves is about 250 micrometers.

4. A stacked coupler for an optical fiber array, according to claim 2, wherein the pitch of said fiber groove of said first ferrule surface and the pitch of said fiber groove of said second ferrule surface are substantially in register.

5. A stacked coupler for an optical fiber array, according to claim 2, wherein the pitch of said fiber groove of said first ferrule surface and the pitch of said fiber groove of said second ferrule surface are substantially one half pitch out of register.

6. A stacked coupler for an optical fiber array, according to claim 1, wherein said retaining plates comprise elastomer.

7. A stacked coupler for an optical fiber array, according to claim 6, wherein said elastomer is silicone rubber.

8. A stacked coupler for an optical fiber array, according to claim 1, wherein said fiber grooves are V-grooves, wherein said V-grooves have a width defined at the ferrule surface and a depth perpendicular to said ferrule surface.

9. A stacked coupler for an optical fiber array, according to claim 8, wherein the minimum width of said V-grooves is about 50 microns.

10. A stacked coupler for an optical fiber array, according to claim 8, wherein the maximum width of said V-grooves is about 250 microns.

11. A stacked coupler for an optical fiber array, according to claim 1, wherein the depth of said fiber grooves is about 50 microns.

12. A stacked coupler for an optical fiber array, according to claim 1, wherein said grooves are formed by etching.

13. A stacked coupler for an optical fiber array, according to claim 1, wherein said grooves are formed by anisotropic wet etching.

14. A stacked coupler for an optical fiber array, according to claim 1, wherein said top and bottom plates comprise silicon.

15. A stacked coupler for an optical fiber array, according to claim 1, wherein said side walls comprise silicon.

16. A stacked coupler for an optical fiber array, according to claim 1, wherein said ferrules comprise silicon.

17. A stacked coupler for an optical fiber array, according to claim 1, wherein said top and bottom plates comprise {100} oriented single crystal silicon.

18. A stacked coupler for an optical fiber array, according to claim 1, wherein said connector pins comprise {100} oriented single crystal silicon.

19. A stacked coupler for an optical fiber array, according to claim 1, wherein said ferrules comprise {100} oriented single crystal silicon.

* * * * *